Patented July 7, 1942

2,289,085

UNITED STATES PATENT OFFICE 2,289,085

MANUFACTURE OF ARTIFICIAL PRODUCTS

Arie van Halewijn, Arnhem, Netherlands, assignor to American Enka Corporation, Enka, N. C., a corporation of Delaware No Drawing. Application November 28, 1938, Serial No. 242,835. In Germany February 18, 1937

24 Claims. (Cl. 18—54)

This application is a continuation in part of my application Serial Number 187,313, filed January 27, 1938.

The present invention relates to the manufacture of cellulosic solutions to be employed in the production of threads, filaments, films and the like. More particularly, my invention is concerned with a novel method for preparing a cellulosic solution from purified cellulose such as soda cellulose, sulphite cellulose, cotton linters, et cetera.

In the manufacture of artificial silk, previously purified cellulose must be converted into a soluble form so that the subsequently formed solution can be reprecipitated or reconstituted into filaments. Heretofore, in order to render the cellulose soluble, it has been customary to react the same with carbon disulphide to thereby convert it into cellulose xanthate, the cellulose xanthate, of course, being soluble in aqueous alkaline solutions. This process involving the use of carbon disulphide not only incurs an additional step but is objectionable because this chemical is odorous, inflammable, poisonous and volatile. Such disagreeable characteristics naturally entail a fire hazard and the probability of bodily injury to those working therewith. Obviously, it is desirable to substitute a method that will permit the dissolution of cellulose directly in the solvent and also to use chemicals having no objectionable properties.

It is, therefore, the object of the present invention to provide a method of dissolving a cellulosic material so that the same can be advantageously used in the production of threads and the like.

Another object of my invention is the provision of a novel type cellulosic spinning solution that will produce improved artificial products.

It is a further object of the present invention to utilize an amphoteric metal that will form a salt with aqueous alkaline solutions and which will dissolve cellulose directly, thereby eliminating a previously necessary step.

In carrying out my improved process a purified cellulosic material such as sulphite cellulose, soda cellulose, cotton linters, et cetera, is subjected to a heat treatment usually substantially above 100° C. Such heat treatment is usually continued for at least 24 hours. It has been determined that by the application of heat to the cellulose the solubility in aqueous alkali metal salt solutions is materially increased and in fact, increased to the extent of making my process practical. Ordinarily, cellulose will not dissolve sufficiently in alkali metal salt solutions and therefore the conversion of cellulose by means of such chemicals has never been successfully employed. The solubility of cellulose increases greatly with a rise in temperature and also with a lengthened heating period. In other words, if the cellulose undergoes a heat treatment that is maintained constant at 115° C. for at least 24 hours, it exhibits an appreciable solubility. For practical purposes, however, it is preferable to employ a higher temperature, for example, 125° C. for a like period, whereby the solubility is further increased. Of course, if it is necessary to employ a somewhat lower temperature, the solubility of the cellulose can be brought to an optimum condition if the heating time or period is correspondingly lengthened. The heating itself can be undertaken in air, but my invention also contemplates heating in vacuo or nitrogen or other inert gaseous medium.

Alternatively the cellulose which is used for dissolving in the aqueous alkaline zincate or stannate solution may be prepared by chemical methods. Of these a particular treatment with sulphite solutions at higher temperature and pressure has been found very satisfactory. It has also been found that unusually good results are obtained by treatment of the cellulose with dilute aqueous soda lye. The cellulose is immersed in soda lye, preferably having a NaOH content of under 8%, for example of 4% NaOH. It is then pressed out, comminuted and subjected to a ripening process, such as is customary in the viscose industry, until the cellulose decomposition has been carried to the desired degree. The alkali-containing cellulose may or may not then be subjected to the above noted treatment with heat before the dissolution in the aqueous alkaline zincate or stannate.

In preparing the solvent, an amphoteric metal such as zinc or tin or the oxide thereof is dissolved in a concentrated alkaline solution, for example, sodium hydroxide and by subsequent dilution with water an aqueous sodium zincate or sodium stannate solution is formed. A suitable solution may be formed by using a concentration of from 5 to 12% sodium hydroxide. Particularly good results are achieved with 8% sodium hydroxide and 2.1% zinc; or in the case of preparing a stannate solution, 8% sodium hydroxide and 2.0% tin is employed.

The pretreated cellulose is introduced usually at low temperatures into the alkali metal salt solution, preferably in pulverized or comminuted form in order to promote and effect a complete dissolution and distribution in the solvent. Usually, amounts of cellulose ranging up to 10% based on the weight of the solution are sufficient for practical purposes. By way of example, 7 parts by weight of cellulose are added to 100 parts by weight of a sodium zincate solution and stirred therein while maintaining the ingredients at room temperature or lower. If it be desired to use a stannate solution rather than a zincate solution, 4 parts by weight of pulverized cellulose are added to 100 parts by weight of a sodium stannate solution. In order to properly and completely dissolve the cellulose the mixture is cooled to approximately 0° C. and preferably even lower temperatures, and further stirred until there are no longer any undissolved particles. The solution, if necessary, is then filtered and after a required length of aging period and conditions imposed during aging is in readiness to be worked into artificial products such as filaments, films, bands, horsehair and the like. As a suitable precipitating agent dilute acids, salt solutions (ammonium salt) or dehydrating agents such as alcohol may be employed.

In the manufacture of artificial filaments the solution is extruded and spun in a manner similar to that in the normal production of viscose artificial silk. In this case the precipitating bath may contain, for example, 13% sulphuric acid, 20% magnesium sulphate and 10% sodium sulphate. The resulting filaments, forming threads, are processed in the usual manner.

Another modification of the process by which even better results are obtained in a much shorter time is to cool the mixture of the zincate or stannate solution with the pretreated cellulose to tempertaures under 0° C., and preferably considerably below 0° C., for example to —8° C. or —10° C. or even lower. The procedure is to allow the mixture of pretreated cellulose and solvent solution to stand first at room temperature for some time, for example ½ hour, whereby the cellulose, particularly when the mixture is stirred somewhat, tends to disintegrate into individual fibers. Thereafter it is rapidly cooled, for example to —8° C., and as soon as this temperature is obtained, the stirring apparatus is set in motion and the mixture stirred for some time, for example 10 minutes, until the solution is free from swollen cellulose fibers. Then the solution is heated as rapidly as possible to room temperature. The solution obtained is ready for spinning.

The following examples are illustrative of the cellulose pretreatment procedure by chemical decomposition:

Sulphite cellulose, as in the cellulose cooking process, is treated 14 hours at 8 atm. pressure in a bisulphite solution with 13.5% $SO_2$ and 2% $Na_2SO_3$. After washing, the cellulose is treated in the manner described above.

In another procedure cellulose, for example in the form of beechwood cellulose, is immersed in sheet form in 4% aqueous soda lye for 1 hour, pressed out to 2.9 times its original weight, comminuted in the usual apparatus and ripened 96 hours at 60° C. The resulting cellulose is dissolved in a sodium zincate solution to form an aqueous spinning solution containing:

7.0% cellulose
7.5% NaOH
2.5% zinc

The cellulose solution is then spun at room temperature in an aqueous spinning bath containing, for example, the following constituents:

6.5% $H_2SO_4$
15.0% $Na_2SO_4$
6.5% $ZnSO_4$
10.0% $Al_2(SO_4)_3$

It is to be understood that the scope of my invention is not to be restricted to the specific conditions and examples given above, as different alkalies may be used and the proportions of zinc or tin dissolved in the alkali may vary, as the foregoing examples are not critical. Moreover, the aqueous alkali metal salt solutions dissolve the cellulose according to the intensity of the preheat treatment and/or the other decomposing processes, and therefore the dissolution of the cellulose in the said solution may be conducted under varying temperature conditions considerably below room temperature and sometimes above 0° C. In general, however, the dissolving step is carried out more successfully at a somewhat lower temperature than 0° C.

My improved product has various uses in addition to those above named, for example, adhesive materials may be manufactured or even artificial leather can be produced. The solutions may also be employed as protective films for the treatment and impregnation of other materials. The invention is to be restricted only to the extent of the appended claims.

What I claim is:

1. In a method of making shaped artificial structures, the steps which comprise degrading purified cellulose, dissolving the cellulose in an alkali metal salt solution of the class consisting of zincate and stannate solutions, aging the cellulosic solution, and forming artificial structures therefrom by precipitating the same in a coagulating medium.

2. In the production of cellulosic solutions, a method which comprises degrading purified cellulose and dissolving the cellulose in an alkali metal salt solution of the class consisting of zincate and stannate solutions.

3. In a method of making shaped artificial structures, the steps which comprise preheating purified cellulose, dissolving the cellulose in an alkali metal salt solution of the class consisting of zincate and stannate solutions, aging the cellulosic solution, and forming artificial structures therefrom by precipitating the same in a coagulating medium.

4. In the production of cellulosic solutions, a method which comprises preheating purified cellulose and dissolving the cellulose in an alkali metal salt solution of the class consisting of zincate and stannate solutions.

5. In a method of making shaped artificial structures, the steps which comprise chemically degrading purified cellulose, dissolving the cellulose in an alkali metal salt solution of the class consisting of zincate and stannate solutions, aging the cellulosic solution, forming artificial structures therefrom by precipitating the same in a coagulating medium.

6. In a production of cellulosic solutions, a method which comprises chemically degrading purified cellulose and dissolving the cellulose in an alkali metal salt solution of the class consisting of zincate and stannate solutions.

7. A process for the manufacture of cellulosic solutions to be used in the production of threads, filaments, films and the like, which comprises pretreating purified cellulose by heating the same to a temperature above 100° C. to thereby increase its solubility, dissolving the cellulose in an aqueous alkali metal salt solution of the class consisting of zincate and stannate solutions, said dissolving step being conducted considerably below room temperature.

8. In the production of cellulosic solutions, a method which comprises decomposing cellulose with a bisulphite solution under pressure and at an elevated temperature and dissolving the cellulose in an aqueous alkali metal salt solution of the class consisting of zincate and stannate solutions.

9. In the production of cellulosic solutions, a method which comprises decomposing cellulose with a dilute soda lye, ripening the treated cellulose and dissolving the cellulose in an aqueous alkali metal salt solution of the class consisting of zincate and stannate solutions.

10. In the production of cellulosic solutions, a method which comprises degrading purified cellulose, mixing said treated cellulose with an aqueous alkali metal salt solution of the class consisting of zincate and stannate solutions, cooling to a temperature not greater than 0° C., holding at this temperature until the cellulose fibers have all been dissolved and then rapidly raising the temperature of the solution to room temperature, whereby after aging the cellulosic solution is in condition for forming artificial products therefrom.

11. A process for the manufacture of cellulosic solutions to be used in the production of threads, filaments, films and the like, which comprises heating purified cellulose to a temperature above 115° C. and containing such heating for at least 24 hours, dissolving the cellulose in an aqueous alkali metal salt solution of the class consisting of zincate and stannate solutions while maintaining the solution at a temperature of at most 0° C.

12. A method as defined in claim 4 wherein the purified cellulose is preheated to a temperature of approximately 125° C. for at least 24 hours.

13. A method as defined in claim 4 wherein the dissolving operation is enhanced by cooling the mixture to a temperature below 0° C.

14. In the production of cellulosic solutions, a method which comprises preheating purified cellulose to a temperature above 100° C. until it is soluble in aqueous alkali metal salt solutions and dissolving the cellulose in a solution of sodium zincate whereupon the solution may be spun in an acid medium to coagulate and form filaments therefrom.

15. A method as defined in claim 14 which further provides for the addition of less than 10% of cellulose based on the weight of the solution and dissolving the same while maintaining the mixture below room temperature.

16. A method as defined in claim 14 which further provides for using an aqueous sodium zincate solution of a composition consisting of about 8% NaOH and 2.1% zinc and dissolving therein 7 parts by weight of cellulose to 100 parts by weight of solvent.

17. In the production of cellulosic solutions, a method which comprises preheating purified cellulose to a temperature above 100° C. until it is soluble in aqueous alkali metal salt solutions and dissolving the cellulose in a solution of sodium stannate whereupon the solution may be spun in an acid medium to coagulate and form filaments therefrom.

18. A method as defined in claim 17 which further provides for the addition of less than 10% of cellulose based on the weight of the solution and dissolving the same while maintaining the mixture below room temperature.

19. A method as defined in claim 17 which further provides for using an aqueous sodium stannate solution of a composition consisting of about 8% NaOH and 2.0% tin and dissolving therein 4 parts by weight of cellulose to 100 parts by weight of solvent.

20. A composition of matter comprising degraded purified cellulose dissolved in an aqueous alkali metal salt solution of the class consisting of zincate and stannate solutions.

21. A composition of matter comprising preheated purified cellulose dissolved in an aqueous alkali metal salt solution of the class consisting of zincate and stannate solutions.

22. A composition of matter comprising purified cellulose which has been heated to a temperature above 100° C. and subsequently dissolved in an aqueous alkali metal salt solution of the class consisting of zincate and stannate solutions.

23. A composition of matter comprising preheated purified cellulose dissolved in an aqueous sodium stannate solution.

24. A composition of matter comprising preheated purified cellulose dissolved in an aqueous sodium zincate solution.

ARIE van HALEWIJN.